Feb. 22, 1927.

W. W. TEW

SPRING WHEEL

Filed Dec. 19, 1924

1,618,689

Inventor
William W. Tew.

By Horace S. Beall
Attorney

Patented Feb. 22, 1927.

1,618,689

UNITED STATES PATENT OFFICE.

WILLIAM W. TEW, OF BANKS, ALABAMA.

SPRING WHEEL.

Application filed December 19, 1924. Serial No. 756,970.

My invention is an improvement in spring wheels for vehicles, and relates more especially to that particular class in which the shock-absorbing springs are interposed between an inner hub section on an outer tire section.

The principal object of my present invention is to construct a spring wheel of this general construction that will effectually provide the required resiliency to absorb shocks to the vehicle in travelling over an uneven roadway to thereby prevent vibrations resulting from such shocks being transmitted to the body of the vehicle.

A further object of my invention is to provide a spring wheel of light construction, consistent with the required strength, for use more especially in connection with automobiles, and in which the several parts cooperating to produce the desired results are thoroughly braced to increase the stability of the wheel and fortify it against unusual strains in use.

Other objects and advantages of my invention will hereinafter appear, and what I claim as new and desire to secure by Letters-Patent is more specifically pointed out in the appended claims.

The wheel is practically made of two sections, an inner hub section 10 and an outer tire section 11, between which the shock absorbing springs 12 and interposed and confined by side plates 13 carried by the tire section and overlapping the hub section.

Figure 1:
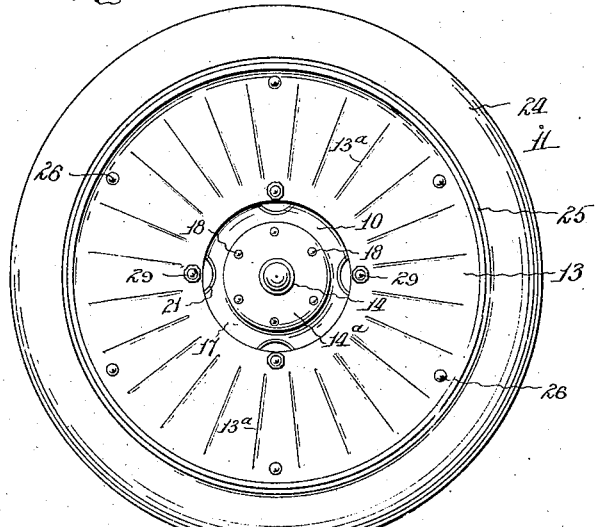
Fig. 1 is a side elevation of a spring wheel constructed in accordance with my invention.
Figure 2:
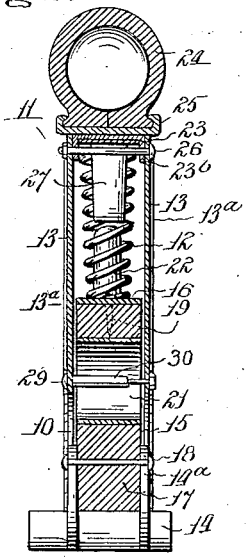
Fig. 2 is an enlarged detail vertical sectional view through the upper half of the wheel.
Figure 3:
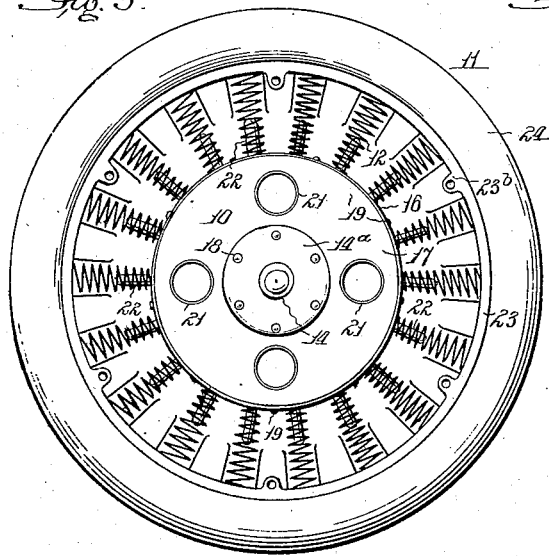
Fig. 3 is a side elevation of the wheel with the side plates removed.
Figure 4:
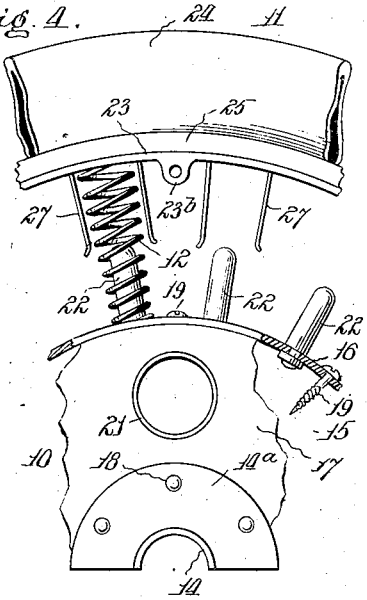
Fig. 4 is an enlarged side elevation of a segment of the wheel as illustrated in Fig. 3.

In the present instance the inner section of the wheel consists of a hub 14, of ordinary construction, and between the spaced apart circumferential flanges 14$^a$ of this hub is attached a wooden block 17, in the form of a disk, said wooden disk having secured around the circumference thereof a metal rim 16. The hub is of the conventional type with one of the flanges removable, and in this instance it permits the disk to be placed in between the flanges, between which latter said wooden disk fits tightly, and by using a solid wooden piece for this part of the hub section lightness, strength, and economy of construction are obtained. For the purpose of securing the wooden disk or block and hub together bolts or rivets 18 are employed, and screws 19 are used in fastening the metal rim 16 to the circumference of said wooden disk. This construction of the hub section provides an important part of the wheel which will be strong and durable to carry and reinforce the connection thereto of the cooperating parts, and for the purpose of connecting the inner ends of the springs 12 to this hub section there are a series of pins or lugs 22 projecting radially from the rim 16, being rigidly secured to said rim, as for instance as illustrated in Fig. 4 of the drawings; while to provide for bracing the side plates 13 13 together and to connect the hub and rim or tire section for turning one by the other, as hereinafter explained, the wooden disk of said hub section is provided with a series of transverse holes, preferably four in number, receiving metal thimbles to present wear-resisting surfaces.

Figures 5, 6:
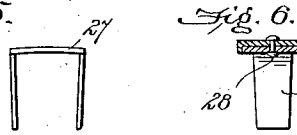
Fig. 5 is a side elevation of one of the plates for bracing the springs.
Fig. 6 is a detail sectional view showing the manner of connecting the bracing plates to the wheel felly.

The outer portion of the wheel or tire section 11 consists of a metal felly or rim 23 which carries the tire 24 and its rim 25, and this felly is formed with inwardly-projecting side flanges 23$^a$ (Fig. 6) and perforated ears 23$^b$, the latter receiving bolts 26 by which the side plates 13 are secured to this portion of the wheel.

The coiled springs 12 which are interposed between the inner hub section and outer tire section fit at their outer ends between the short side flanges 23$^a$ of the rim 23, being sprung into this position after their inner ends are fitted over the projecting pins or lugs 22; it being understood that when the wheel is completed—that is all the springs are applied—said springs are under such tension between the hub and tire sections that they will not become displaced in the operation of the wheel or when a spring comes to the upper part of the wheel and is slightly expanded by the weight of the vehicle; in other words, in putting a spring in place it is contracted to some extent. As explained the outer ends of the springs are retained against lateral displacement by the inturned side flanges 23ª of the rim 23, and in order to hold them against circumferential movement, as well as to brace them for a distance of their outer length, I provide U-shaped plates 27 positioned between said springs to impinge against the same, being rigidly secured to the rim by rivets 28. The connecting portion of these U-shaped plates fits between the side flanges 23ª and the projecting members thereof bear against adjoining springs, and it will be noted that said projecting members extend to near the outer ends of the pins or lugs 22 whereby these elements—the plates and lugs—cooperate to brace the springs and effectively increase the stability of the wheel. The particular means described for holding the outer ends of the springs against circumferential and lateral play also provides for easily substituting a new spring for an old one, inasmuch as it is only necessary to place the inner end of a spring over the projecting lug 22 and then contract said spring sufficiently so that the outer end thereof can be sprung into position between the flanges 23ª and projecting members of the U-shaped plates.

The two sections hereinbefore described constituting the main parts of the wheel and held apart resiliently by the interposed springs are fortified against independent lateral movement with respect to each other by means of the side plates 13, which are in the form of annular metal disks rather thin but reinforced by ribs 13ª extending radially; for in this instance, as in the construction of the aforementioned main sections of the wheel, it is my purpose to lighten the wheel structure as much as possible without sacrificing the required strength according to the use for which the wheel is to be made; that is to say, whether for a light automobile or a heavy motor vehicle, in the latter instance, however, it being necessary only to provide thicker plates, stronger springs, &c.

It will be apparent from the drawings that in the operation of the wheel, applied to an automobile the pulling force is exerted on one of the sections—the hub section of rear wheels and the tire section of the front or guiding wheels—and communicated to the other section through the medium of the springs, and of course in the ordinary running of the vehicle the comparatively light strain on the springs is taken up by all of them, but in order to limit the circumferential movement of the pulling section with respect to the other section when an extraordinary pulling strain is exerted said sections are connected by bolts 29 extending between the side plates 13 of the tire section through the openings 21 in the hub section, said bolts being preferably provided with rollers 30 to reduce friction when either section of the wheel is moved to bring the bolt or roller thereon against the side of the opening.

Although I have shown the wheel as provided with a pneumatic tire it will be understood of course that the resiliency of the spring wheel will permit the use of a solid tire, inasmuch as the springs interposed between the wheel sections provide a resiliency that will effectively take up or absorb shocks to which the wheel may be subjected in use, and of course this form of shock absorber for automobiles is located at the most effective point.

I claim:—

1. A spring wheel for vehicles comprising an inner hub section having lugs projecting from the periphery thereof, an outer rim section having inwardly projecting side flanges, and tapered springs engaging the lugs on the hub section and seated between the flanges of the rim section; together with U-shaped plates attached to the rim section between the outer ends of the springs and presenting inwardly projecting members extending to and cooperating with the aforesaid lugs for holding the springs in place.

2. A spring wheel for vehicles comprising an inner hub section having radially projecting round lugs projecting from the periphery thereof at a distance therefrom, an outer rim section having inwardly projecting side flanges, and tapered spiral springs the inner contracted ends of which engage the lugs on the hub section and the outer wider ends of which fit between the aforesaid flanges of the rim section; together with U-shaped plates secured within the rim section between the flanges thereof and between the outer ends of the springs, the members of companion U-shaped plates confining the outer ends of adjoining springs and projecting inwardly to near the outer ends of the lugs on the hub section to cooperate with said lugs to hold the springs in place.

WILLIAM W. TEW.